United States Patent [19]
Kemichick

[11] Patent Number: 5,477,603
[45] Date of Patent: Dec. 26, 1995

[54] APPARATUS AND METHOD TO GUIDE A CONTROL ASSEMBLY THROUGH AN INSTRUMENT PANEL OPENING

[75] Inventor: James A. Kemichick, Shelby Township, Mich.

[73] Assignee: Chrysler Corporation, Highland Park, Mich.

[21] Appl. No.: 239,790

[22] Filed: May 9, 1994

[51] Int. Cl.⁶ .................................................. B23Q 3/00
[52] U.S. Cl. ................................................ 29/468; 29/271
[58] Field of Search ........................... 29/241, 271, 433, 29/464, 468; 296/70; 180/90; 206/335

[56] References Cited

U.S. PATENT DOCUMENTS

| | | | |
|---|---|---|---|
| 1,355,781 | 10/1920 | Rodgers | 29/464 |
| 2,394,884 | 2/1946 | Adrias, II | 29/241 |
| 4,450,609 | 5/1984 | Hamilton. | |
| 4,466,166 | 8/1984 | Hogarth | 29/450 |
| 4,672,730 | 6/1987 | Schrom et al. | 29/241 |
| 4,875,273 | 10/1989 | Yamamoto. | |
| 4,996,768 | 3/1991 | Seyller. | |
| 5,005,898 | 4/1991 | Benedetto et al.. | |
| 5,088,571 | 2/1992 | Burry et al.. | |

*Primary Examiner*—David P. Bryant
*Attorney, Agent, or Firm*—Kenneth H. MacLean

[57] ABSTRACT

Typically in assembling an instrument panel to a vehicle body, a HVAC (heater, ventilator, and air conditioner) control assembly, or the like, attached by flexible cables to the vehicle body must be inserted through an opening in the instrument panel and this operation requires the services of an assembly worker to guide the control assembly through the opening. The subject apparatus and assembly method facilitates movement of the instrument panel into an assembled position with the HVAC control assembly extending through the opening in the instrument panel.

3 Claims, 3 Drawing Sheets

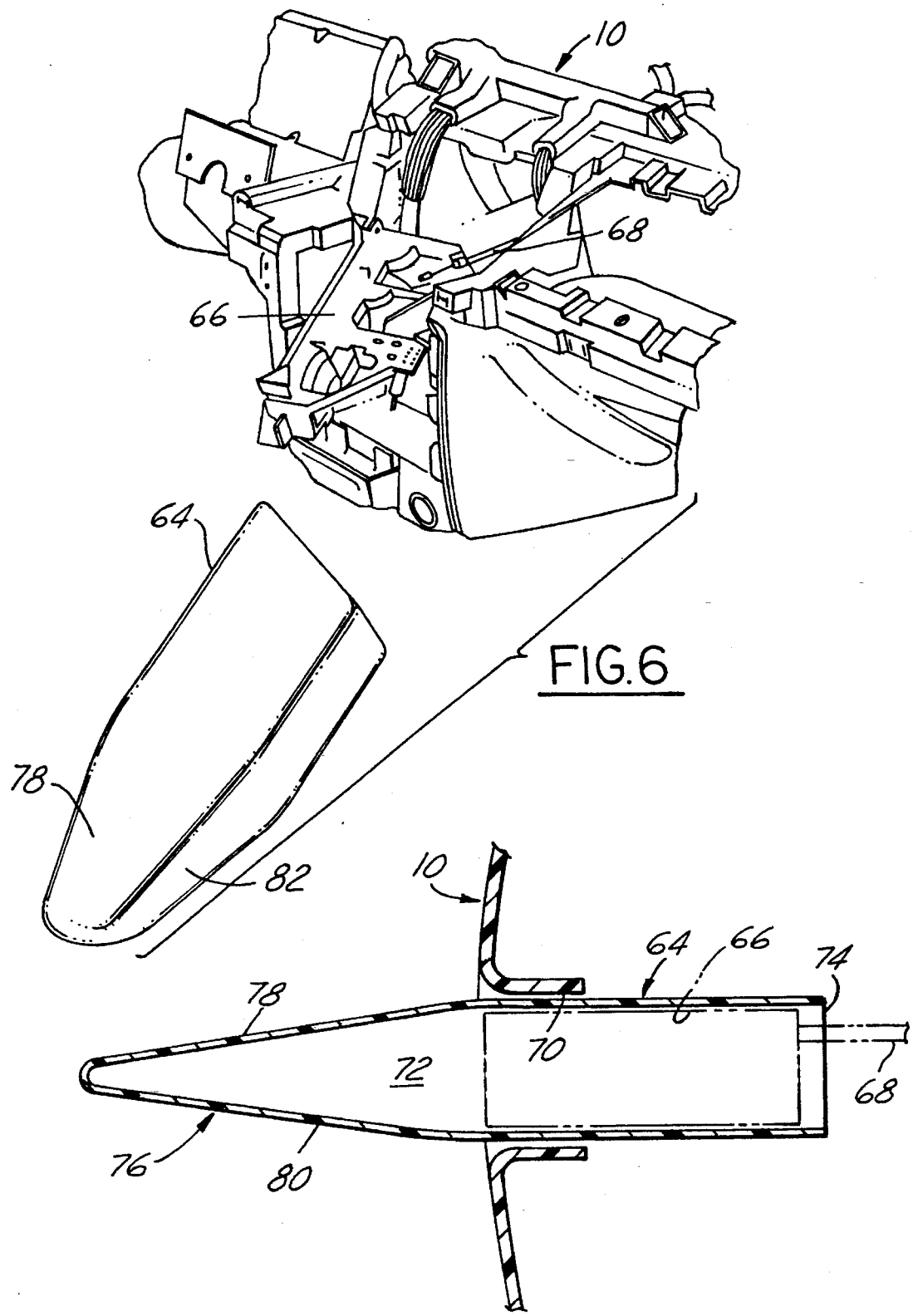

APPARATUS AND METHOD TO GUIDE A CONTROL ASSEMBLY THROUGH AN INSTRUMENT PANEL OPENING

BACKGROUND OF THE INVENTION

1. Field of the Invention

This invention relates to apparatus and a method for assembling a vehicle instrument panel to the vehicle body and a concurrent guidance of a HVAC control assembly, or the like, through an opening in the instrument panel.

2. Description of Related Art

A preliminary search uncovered the following prior art.

In the U.S. Pat. Nos. 4,450,609 to Hamilton and 4,996,768 to Seyler, guides for installing camshafts into engines are disclosed.

In the U.S. Pat. Nos. 4,875,273 to Yamamoto; 5,005,898 to Benedetto et al.; and 5,088,571 to Burry et al. apparatus and methods of intrument panel installation are disclosed but there is not a disclosure of the subject guide member for directing movement of a component through an aperture in the intrument panel.

After reading the following detailed description of this application, it will be appreciated that specific features of the subject are not disclosed in the known prior reference or any other prior art known to the applicant.

SUMMARY OF THE INVENTION

This invention is directed to an apparatus and a method to facilitate the installation of an intrument panel into a vehicle body and more particularly to guide a component such as a HVAC control assembly through an aperture in the panel.

The apparatus comprises a generally hollow guide member with an open end portion and a close ended portion, the open end portion receiving the control assembly inserted therein prior to installing the panel to the vehicle. The close end portion is placed into the aperture and then the panel is moved therepast into an installed position. Lastly, the guide member is removed.

Previously, a separate installer worker was necessary to guide movement of the control assembly through the aperture. The subject apparatus and method eliminates that need.

Other features and advantages of the invention will become more apparent from the following detailed description of an embodiment of the invention shown in the accompanying drawings.

DESCRIPTION OF THE DRAWINGS

FIG. 6 is a perspective view similar to FIG. 5 but with the guide apparatus moved away from the HVAC control and into the interior of the vehicle body; and FIG. 7 is an enlarged and elevational view of the HVAC control in outline within the guide apparatus at an intermediate assembly stage with the guide positioned partially into the opening in the instrument panel.

DETAILED DESCRIPTION OF AN EMBODIMENT

Figure 1:
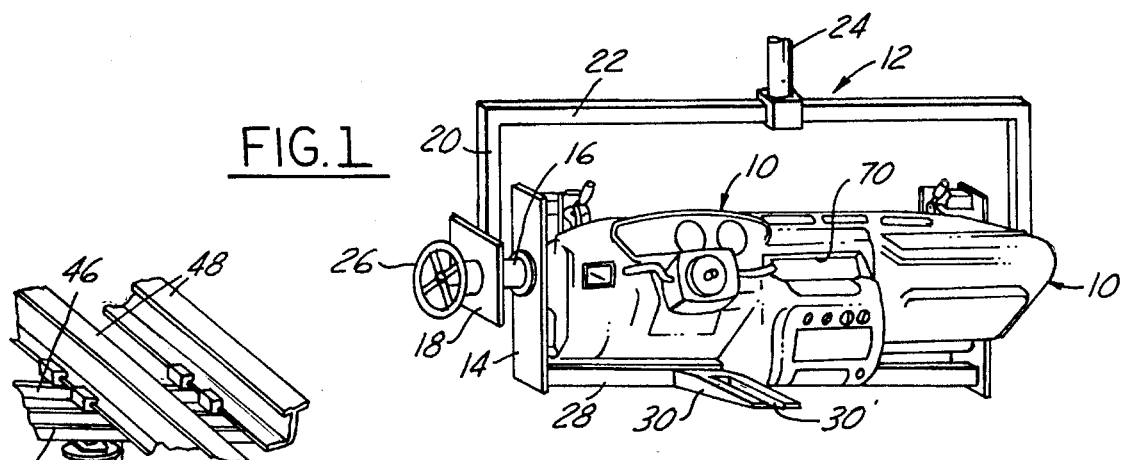
FIG. 1 is a perspective view of a vehicle instrument panel supported by a trunion fixture which is used in a preassembly wiring operation and for transport of the wired panel to the assembly line location where the panel will be added to the vehicle.

FIG. 1 illustrates a typical vehicle instrument panel 10 supported by a movable trunion fixture 12. Fixture 12 holds the panel 10 during a pre-assembly wiring operation and then transports the panel 10 to the assembly line location where it is subsequently placed into the vehicle interior. Specifically, fixture 12 grips panel 10 at its opposite end portions by means of brackets 14 (only the left bracket is visible). Each bracket 14 is attached to a shaft 16 which is supported by an end plate 18 which in turn is supported by a side arm 20 and cross-arm 22. The fixture 12 and panel 10 are supported by a vertical member 24 which is connected to a means to move the fixture and panel from the wiring station to the assembly point on the assembly line. Shaft 16 extends through end plate 18 and has wheel 26 attached to its end so that the shaft 18, the plate 14 and the panel 18 can be selectively pivoted by turning the wheel 26. The selective pivoting of the panel facilitates wiring of the panel 10 prior to assembly into the vehicle.

Figure 2:
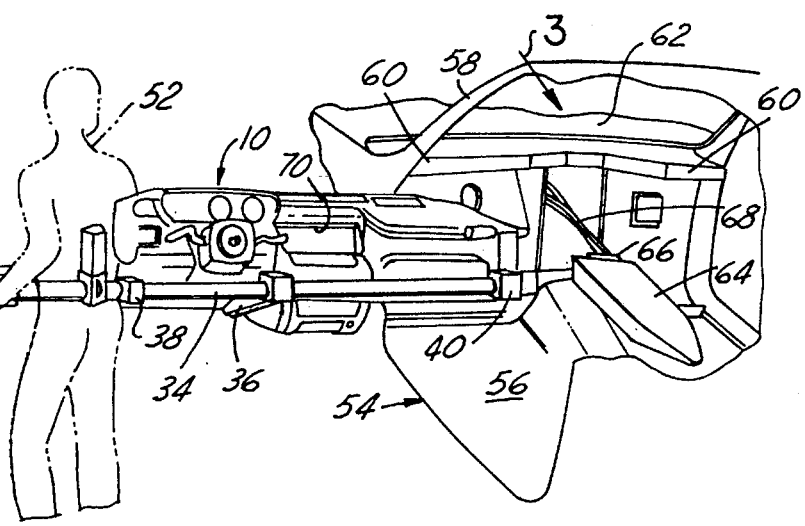
FIG. 2 is a perspective view similar to FIG. 1 of an instrument panel supported by an installation assembly used to move the instrument panel into a vehicle interior.

The fixture 12 includes a bottom cross-arm 28 which supports an inclined and grooved guide ramp 30. The ramp 30 is for alignment purposes when the panel is transmitted to the installation assembly 32 which is shown in FIG. 2. The installation assembly 32 includes an arm member 34 extending along the panel 10 and has a central guide member 36 adapted to cooperate with the groove 30' of ramp 30. The resultant alignment by mating the member 36 with the groove 30' provides an accurate transfer of the panel from fixture 12 to installation assembly 32 prior to assembly of the panel to the vehicle. After the transfer, the panel 10 is secured to the assembly 32 by brackets 38, 40.

FIG. 2 shows the support of arm 34 of installation assembly 32 by a generally horizontal member 42 which in turn is supported by a generally vertical member 44. In turn, the member 44 is attached to frame members 46 which are secured to beams 48. The assembly 32 includes a control panel 50 which is supported on arm 34 and is provided for operation by an installer 52. The control panel 50 directs movements of the panel by the assembly 32 to install the panel into an interior of a vehicle.

In FIG. 2 a portion of a vehicle body 54 is shown which includes a portion of the floor 56, a windshield frame 58, and a bracket or support structure 60 for the panel 10 which extends along and slightly below the bottom portion of the windshield frame 58. Also, a portion of the vehicle's hood 62 is visible in FIG. 2. As seen inside vehicle body 54, a control assembly guide member 64 lies on floor 56 and extends rearwardly from the portion of the body associated with the windshield. This guide member 64 will be explained in more detail hereinafter. Briefly however, the guide member 64 is a hollow enclosure into which a HVAC control assembly 66 is inserted (shown mostly within member 64). The assembly 66 is attached to the vehicle body by flexible cables 68 which are incapable of supporting the assembly 66.

The above introduces the background for a discussion of problems encountered during installation of the instrument panel 10. Panel 10 is assembled to the body by inserting it into the interior of the body and then moving it forward toward bracket portions 60. Simultaneously, the HVAC controller 66 must be inserted through an aperture or opening 70 in the panel 10. Previously, an installer or worker was needed to insert and guide the assembly 66 through the aperture 70 as the panel moved forward into engagement with the bracket portion 60. The subject apparatus and method of installation eliminates the need for this operator.

As mentioned above, the guide member 64 directs movement of the HVAC assembly 66 through aperture 70. Referring now to FIG. 7, the guide member 64 is shown in cross-section and is a generally hollow, elongate, and thin-walled member defining interior space 72. The guide member 64 has an open end 74 sufficiently sized to allow the member 64 to be inserted over and about the HVAC control assembly 66. A closed end-portion 76 is formed at an opposite end of guide member 64 and has obliquely sloping top and bottom walls 78, 80 and inwardly directed side walls 82 as can be understood by reference to FIG. 6. The top, bottom and sides are designed to smoothly guide the member and the assembly 66 into and through the aperture 70.

Figure 3:
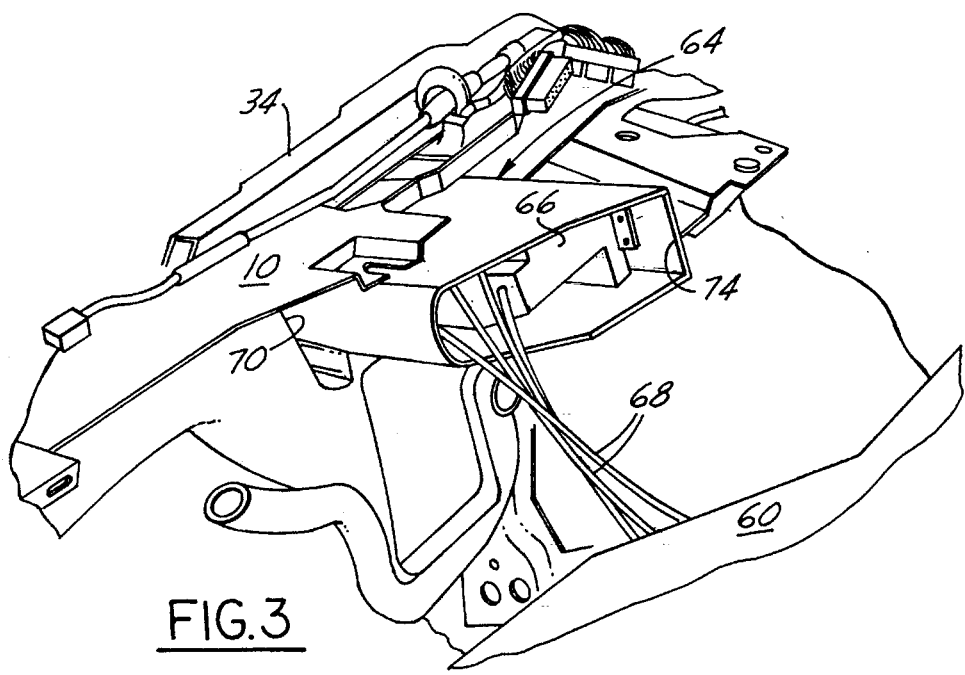
FIG. 3 is a partial perspective view of the instrument panel and vehicle body looking rearwardly through the vehicle windshield frame along a view line 3 as shown in FIG. 2 and with the instrument panel moved by the assembly fixture into the vehicle interior relatively close to the final assembled position wherein a HVAC control sheathed within a guide apparatus is entering an opening in the instrument panel.
Figure 4:
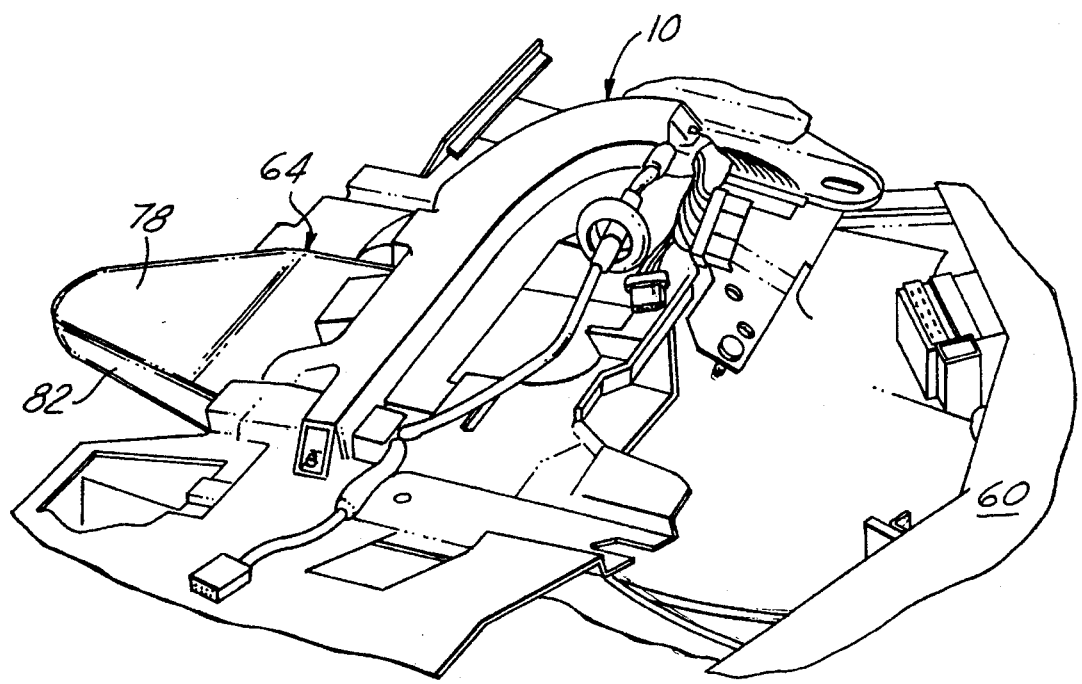
FIG. 4 is a perspective view similar to FIG. 3 but showing movement of the HVAC control and its guide apparatus later in the assembly of the instrument panel to the vehicle body.
Figure 5:
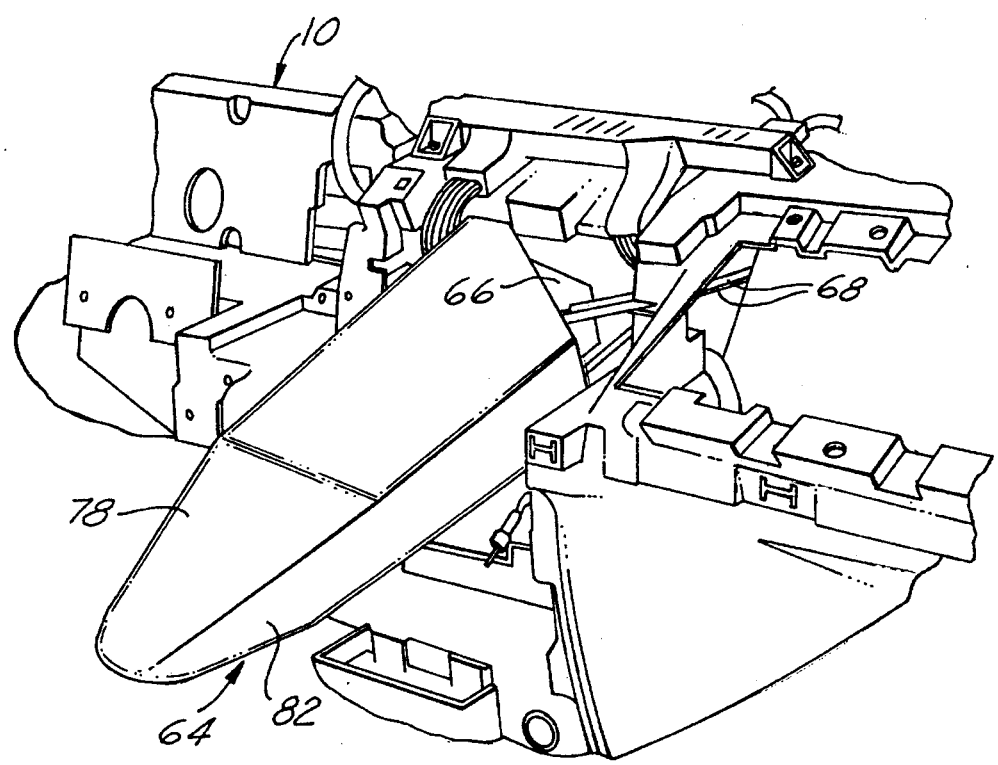
FIG. 5 is a perspective view from inside the vehicle body and looking forwardly in a generally opposite direction than view line 3 wherein the instrument panel has been moved to its support position relative to the vehicle body with the HVAC control and its guide apparatus advanced through the opening in the instrument panel.

In FIGS. 2–6, the sequence of the installation or assembly of the panel 10 to the vehicle body is illustrated. First, in FIG. 2 the guide member 64 has been inserted over the HVAC control assembly 66. Then, the panel 10 is moved into the interior of vehicle body 54 but spaced away from the bracket structure 60 as seen in FIG. 3. Before moving the panel forward, the closed end portion (defined by wall portions 78, 80, and 82) of the guide member 64 (with assembly 66 within) is placed through the aperture in the panel. Then the panel is moved forward by the installation assembly 32 toward the bracket structure 60 as seen in FIG. 4 until the panel 10 engages the bracket structure 60 as seen in FIG. 5. In this position, the guide member 64 with control assembly 66 therein has been moved through the aperture 70. Then the installer removes the guide member 64 to expose the control assembly 66 as seen in FIG. 6.

The configuration of the guide member 64 presents smooth surfaces so that movement through aperture 70 is facilitated. Previously, the movement of the irregularly shaped control assembly through the aperture (without the guide member) was difficult and required careful manual guidance by an installer. Thus, this discovery increases the efficiency of the installation process.

Although only a single embodiment of the invention has been illustrated in the drawings and described in detail, it is clear that modifications in the structure could be made without falling outside the scope of the invention as detailed in te following claims which describe the invention.

What is claimed is:

1. In a vehicle body with a control assembly loosely attached thereto by at least one flexible cable, a guide apparatus for efficiently installing an apertured instrument panel to the vehicle body characterized by the control assembly and flexible cables projecting through the aperture of the instrument panel, the guide apparatus comprising: a generally thin walled, hollow guide member with a closed end portion and an opposite open end portion; said guide member sized and configured adjacent said open end to permit insertion of the control assembly through said open end and enclosure of the control assembly within said guide member, with said at least one flexible cable extending through said open end; said closed end portion of said guide member being oriented to enter the aperture of the instrument panel as the instrument panel moves to an installed position on the vehicle body; said closed end of said guide member having a relatively small cross-sectional profile relative to portions about the control assembly and adjacent said open end to facilitate entry into the aperture of the instrument panel.

2. The guide member set forth in claim 1 being elongated in an axial direction between said closed and open end portions; and including surfaces with respect to said axial direction which surfaces extend between said closed and open end portions whereby said inclined surfaces smoothly direct the guide member into and through the aperture of the instrument panel.

3. In a vehicle body with a control assembly loosely attached thereto by at least one flexible cable and an enclosure member with a closed end and an open end for guiding the control assembly through an aperture in an instrument panel, a method of simultaneously moving the instrument panel toward the vehicle body into an installed position and guiding the control assembly through the aperture, comprising the steps of: moving the enclosure member relative to the control assembly so that the control assembly is inserted into the enclosure member; positioning the closed end of said enclosure member so as to be generally aligned with the aperture; moving the instrument panel toward the vehicle body so that the enclosure member enters the aperture; removing the enclosure member from the control assembly subsequent to the instrument panel moving into a desired installation position relative to the vehicle body.

* * * * *